(12) United States Patent
Nakao

(10) Patent No.: US 11,335,504 B2
(45) Date of Patent: May 17, 2022

(54) FILM CAPACITOR, COMBINATION TYPE CAPACITOR, INVERTER, AND ELECTRIC VEHICLE

(71) Applicant: KYOCERA Corporation, Kyoto (JP)

(72) Inventor: Yoshihiro Nakao, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 120 days.

(21) Appl. No.: 16/963,765

(22) PCT Filed: Jan. 24, 2019

(86) PCT No.: PCT/JP2019/002306
§ 371 (c)(1),
(2) Date: Jul. 21, 2020

(87) PCT Pub. No.: WO2019/146707
PCT Pub. Date: Aug. 1, 2019

(65) Prior Publication Data
US 2021/0043384 A1 Feb. 11, 2021

(30) Foreign Application Priority Data

Jan. 29, 2018 (JP) .............................. JP2018-012753
Mar. 29, 2018 (JP) .............................. JP2018-064799

(51) Int. Cl.
| *H01G 4/232* | (2006.01) |
| *H01G 4/33* | (2006.01) |
| *H01G 4/38* | (2006.01) |
| *B60L 50/51* | (2019.01) |
| *H02P 27/06* | (2006.01) |

(52) U.S. Cl.
CPC .............. *H01G 4/232* (2013.01); *B60L 50/51* (2019.02); *H01G 4/33* (2013.01); *H01G 4/38* (2013.01); *H02P 27/06* (2013.01); *B60L 2210/40* (2013.01)

(58) Field of Classification Search
CPC ............ H01G 4/232; H01G 4/33; H01G 4/38; H01G 4/008; B60L 50/51; H02P 27/06
USPC ....................... 361/303, 301.4, 301.5, 306.3
See application file for complete search history.

(56) References Cited

U.S. PATENT DOCUMENTS

2014/0301019 A1   10/2014   Zhu

FOREIGN PATENT DOCUMENTS

| JP | 06-267786   A | 9/1994 |
| JP | 10-308323   A | 11/1998 |
| JP | 2004-363431 A | 12/2004 |
| JP | 2005-085870 A | 3/2005 |

(Continued)

*Primary Examiner* — Arun Ramaswamy
(74) *Attorney, Agent, or Firm* — Volpe Koenig

(57) ABSTRACT

A film capacitor includes a main body portion. A dielectric film of the main body portion includes an insulation margin in a first direction. A first metal film and a second metal film are each separated by first slits which each includes a first end which is at an angle of θ1 to the second side face, and second slits. The second slit is connected at a contact point to the first slit, and includes a second end which is located on a negative side in the first direction relative to the contact point. The second end is positioned in alignment with a first end of a first slit which is continuous with the second slit adjacent thereto on the negative side in the first direction. A value of tan (θ1) is in a range of 0.15 or more and 0.35 or less.

12 Claims, 11 Drawing Sheets

(56) References Cited

FOREIGN PATENT DOCUMENTS

| JP | 5012524 B | 8/2012 | |
|---|---|---|---|
| JP | 2015-153998 A | 8/2015 | |
| WO | 2013/082951 A1 | 6/2013 | |
| WO | WO-2017159672 A1 * | 9/2017 | ............... H01G 4/32 |

* cited by examiner

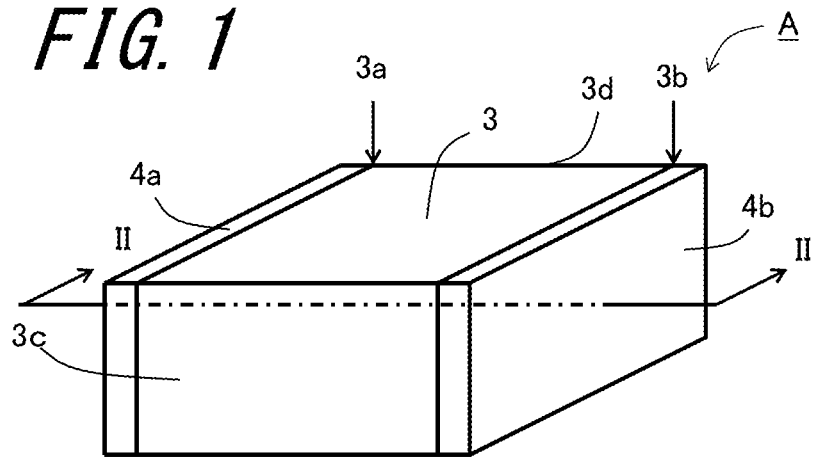
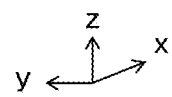
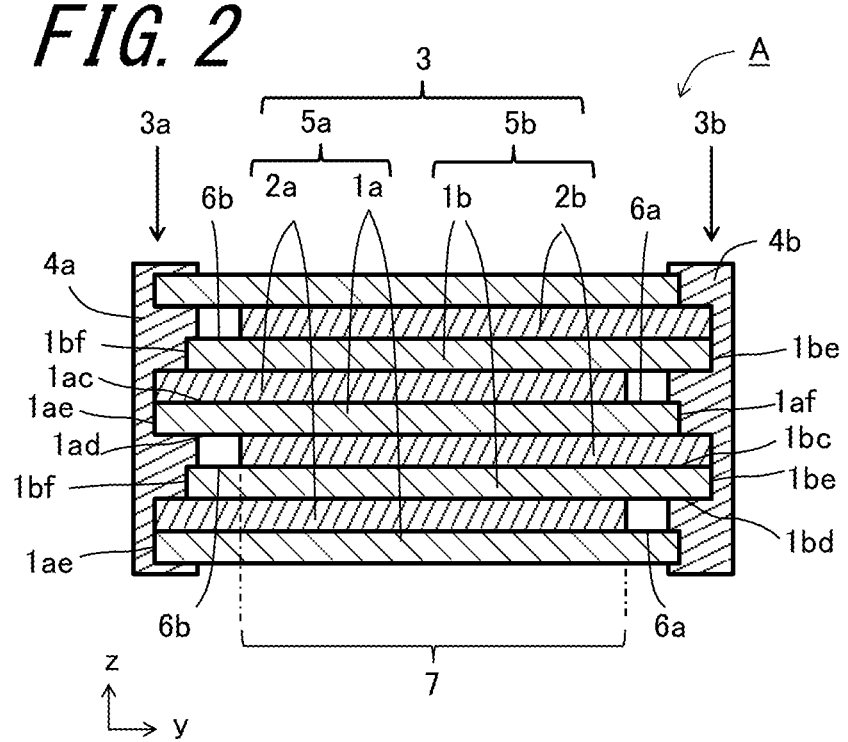

FILM CAPACITOR, COMBINATION TYPE CAPACITOR, INVERTER, AND ELECTRIC VEHICLE

CROSS-REFERENCE TO RELATED APPLICATIONS

This application is a national stage entry according to 35 U.S.C. 371 of International Application No. PCT/JP2019/002306, filed on Jan. 24, 2019, which claims priority to Japanese Patent Application Nos. 2018-012753, filed on Jan. 29, 2018, and 2018-064799, filed on Mar. 29, 2018, the contents of which are entirely incorporated herein by reference.

TECHNICAL FIELD

The present disclosure relates to a film capacitor, a combination type capacitor, an inverter, and an electric vehicle.

BACKGROUND

For example, a film capacitor includes a dielectric film made of polypropylene resin in film-like form, and a metal film formed on the surface of the dielectric film by vapor deposition. The metal film is used as an electrode. In the film capacitor so constructed, in the event of electrical short circuit occurring at an insulation defect point in the dielectric film, the metal film lying around the defect point is volatilized for release by short-circuit-induced energy, with the consequent attainment of electrical insulation in the insulation defect point of the dielectric film. The film capacitor including such a self-healing capability is resistant to dielectric breakdown.

With its resistance to troubles such as ignition or electric shock that arise due to electrical short circuit occurring in an electric circuit, the film capacitor has recently been put to an increasingly wider range of uses, including application to a power circuit for LED (Light Emitting Diode) illumination, etc., application to motorized drive for a hybrid car, and application to an inverter system for photovoltaic power generation.

Film capacitors are classified as wound structures and laminated structures. As to a wound type film capacitor, degradation in self-healing performance tends to arise in the vicinity of the center of a winding as the number of turns in the winding rises. As another negative aspect, placing a wound type film capacitor in a case leaves wasted space in the case. On the other hand, a laminated type film capacitor is less prone to degradation in self-healing performance encountered in the making of a wound type film capacitor. As another positive aspect, placing a laminated type film capacitor in a case leaves no wasted space in the case.

A laminated type film capacitor is typically obtained by cutting a laminate including a plurality of dielectric films and metal films. In this case, the dielectric film and the metal film are cut at one time, leaving the metal film exposed at the cut surface of the laminate. As suggestions as to how to reduce insulation degradation at the cut surface, for example, a method of removing metal films at a location of cutting, and a metal film splitting pattern that permits electrical insulation at a cut surface have been disclosed to date (refer to WO 2013/082951 and Japanese Unexamined Patent Publication JP-A 2015-153998 (Patent Literatures 1 and 2)).

SUMMARY

A film capacitor according to the disclosure includes: a main body portion shaped in a rectangular prism, including a laminate including at least one set of a dielectric film, a first metal film and a second metal film, the first metal film and the second metal film being disposed to face each other with the dielectric film lying in between; and external electrodes located on surfaces of the main body portion. The main body portion includes a pair of opposed faces located opposite to each other in a thickness direction of the dielectric film, and a pair of first side faces opposed to each other and a pair of second side faces opposed to each other, each providing a connection between the pair of opposed faces. The external electrodes are disposed on the first side faces. In the case where a direction of arrangement of the second side faces is a first direction, the dielectric film includes an insulation margin that is located on a part of the dielectric film which part is not covered with the first metal film or the second metal film. The insulation margin extends continuously in the first direction. The first metal film and the second metal film each include a plurality of film segments separated by a plurality of first slits and a plurality of second slits, the plurality of first slits each including a first end which is contiguous to the insulation margin and at an angle of $\theta 1$ to the second side face, the plurality of second slits each including an oblique slit at an angle of $\theta 2$ to the first side face. In the case where it is defined that the contact point in a first end-to-contact point direction in each one of the first slits is located on a positive side in the first direction, the second slit includes a second end which is located away from the insulation margin relative to the contact point, and also located on a negative side in the first direction relative to the contact point. A second end of one of two second slits disposed adjacent to each other which is located on the positive side in the first direction is positioned in alignment with the a first end of a first slit which is continuous with the other second slit located on the negative side in the first direction, or positioned on the negative side in the first direction beyond the first end in the first direction. With respect to the angle of $\theta 1$, a value of $\tan(\theta 1)$ falls in a range of 0.15 or more and 0.35 or less.

A combination type capacitor according to the disclosure includes: a plurality of film capacitors; and at least one bus bar electrically connecting all of the plurality of film capacitors, the plurality of film capacitors including the film capacitor described above.

An inverter according to the disclosure includes: a bridge circuit including switching elements; and a capacitance member connected to the bridge circuit, the capacitance member including the film capacitor described above.

An electric vehicle according to the disclosure includes: a power supply; the inverter described above, connected to the power supply; a motor connected to the inverter; and wheels driven by the motor.

BRIEF DESCRIPTION OF DRAWINGS

FIG. 1 is a perspective view showing a film capacitor;

FIG. 2 is a sectional view showing an example of the film capacitor shown in FIG. 1 taken along the line II-II in FIG. 1;

DETAILED DESCRIPTION

Figure 3:
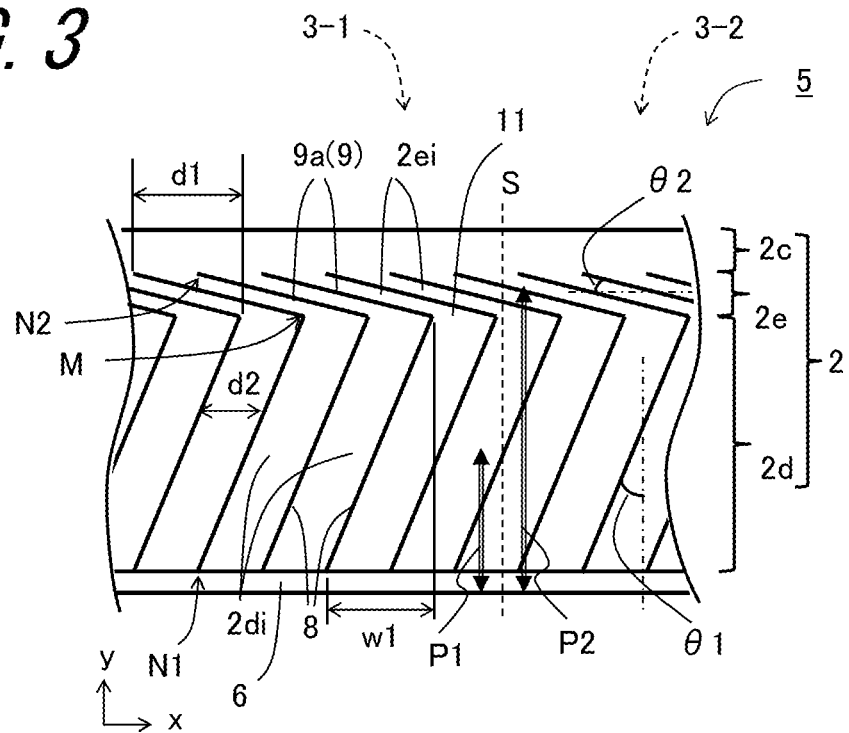
FIG. 3 is a plan view showing an example of a metallized film.

As shown in FIGS. 1 and 2, a laminated type film capacitor includes a film capacitor main body portion 3 and a pair of external electrodes, namely a first external electrode 4a and a second external electrode 4b. The film capacitor main body portion 3 will also be hereinafter called merely "main body portion 3". The main body portion 3 includes a laminate including one or more sets of a first dielectric film 1a and a first metal film 2a and one or more sets of a second dielectric film 1b and a second metal film 2b. The main body portion 3 is shaped in a rectangular prism including a pair of opposed faces located in a lamination direction thereof, and a pair of first side faces 3a and 3b opposed to each other and a pair of second side faces 3c and 3d opposed to each other, each providing a connection between the pair of opposed faces. The first external electrode 4a and the second external electrode 4b are attached to the first side face 3a and the first side face 3b, respectively, by means of Metallikon. The opposed second side faces 3c and 3d of the main body portion 3 are each free of the external electrode. The first external electrode 4a and the second external electrode 4b may also be called merely "external electrode 4".

In the laminated type film capacitor A shown in FIG. 2, the main body portion 3 includes a laminate in which first metallized films 5a and second metallized films 5b are alternately laminated, the first metallized films 5a each including the first dielectric film 1a and the first metal film 2a deposited on a first face 1ac of the first dielectric film 1a, the second metallized films 5b each including the second dielectric film 1b and the second metal film 2b deposited on a second face 1bc of the second dielectric film 1b. The first metal film 2a is electrically connected to the first external electrode 4a at the first side face 3a of the main body portion 3. The second metal film 2b is electrically connected to the second external electrode 4b on the first side face 3b of the main body portion 3. As shown in FIG. 1, the direction of arrangement of the external electrode-free second side faces 3c and 3d is defined as a first direction x, and the direction of arrangement of the first external electrode 4a and the second external electrode 4b is defined as a second direction y. Moreover, the thickness direction of the first dielectric film 1a and the second dielectric film 1b is defined as a third direction z. The third direction z conforms to the lamination direction of the first dielectric film 1a and the second dielectric film 1b.

FIG. 2 is a sectional view of the construction shown in FIG. 1 taken along the line II-II in FIG. 1. In FIG. 2, the direction of length of the first dielectric film 1a, the second dielectric film 1b, the first metal film 2a, and the second metal film 2b corresponds to the first direction x, the direction of width thereof corresponds to the second direction y, and the direction of thickness thereof corresponds to the third direction z.

In the film capacitor A, the first dielectric film 1a includes a first face 1ac and a second face 1ad which are disposed to face each other in the third direction z, and a first side 1ae and a second side 1af which are disposed to face each other in the second direction y. Moreover, the second dielectric film 1b includes a first face 1bc and a second face 1bd which are disposed to face each other in the third direction z, and a first side 1be and a second side 1bf which are disposed to face each other in the second direction y.

The first metallized film 5a is obtained by forming the first metal film 2a on the first face 1ac of the first dielectric film 1a. In the first metallized film 5a, on a part of the first face 1ac located close to the second side 1af, there is provided a so-called insulation margin 6a, in the form of a continuous portion extending in the first direction x, where the first dielectric film 1a is exposed.

The second metallized film 5b is obtained by forming the second metal film 2b on the first face 1bc of the second dielectric film 1b. In the second metallized film 5b, on a part of the first face 1bc located close to the second side 1bf, there is provided a so-called insulation margin 6b, in the form of a continuous portion extending in the first direction x, where the second dielectric film 1b is exposed.

As shown in FIG. 2, there is provided one or more sets of the metallized film 5a and the metallized film 5b laminated together in the third direction z so as to be slightly displaced in relation to each other in the second direction y, i.e. the width direction.

Upon a potential difference between the first metal film 2a and the second metal film 2b, capacitance is set up in an effective region 7 where the first metal film 2a and the second metal film 2b overlap with each other, with the first dielectric film 1a or the second dielectric film 1b lying between them.

The following describes a procedure for forming such a laminated type film capacitor A. A laminate is produced by stacking the elongated first and second metallized films 5a and 5b one upon another in such a manner that they are slightly displaced in relation to each other in the second direction y, i.e. the width direction. In the resulting laminate, the external electrode 4a and the second external electrode 4b are formed by Metallikon on the first side face 3a and the first side face 3b, respectively, arranged in the second direction y. The laminate provided with the external electrode 4a and the second external electrode 4b is cut in lengths in the first direction x to obtain separate main body portions 3. The external electrode 4 may be formed after the cutting of the laminate. The external electrode 4 may be formed on each of the separate main body portions 3.

The following description of embodiments deals with such characteristics as are common to the first metallized film 5a and the second metallized film 5b of the film capacitor A, and hence, as shown in FIG. 3, the first/second dielectric film, the first/second metal film, and the first/second metallized film may also be hereinafter called merely "the dielectric film 1", "the metal film 2", and "the metallized film 5", respectively, with the reference letters "a" and "b" omitted.

In FIG. 3, there is shown an example of the metallized film 5. The metal film 2 includes a first portion 2d adjacent to the insulation margin 6, and a second portion 2e located on the side of the first portion 2d which is opposite to the insulation margin 6. The first portion 2d includes a plurality of first film segments 2di separated by a plurality of first slits 8 each including a first end N1 which is contiguous to the insulation margin 6 and inclined at an angle of θ1 to the second side faces 3c and 3d.

The second portion 2e includes a plurality of second film segments 2ei separated by a plurality of second slits 9. Each single second slit 9 is connected at a contact point M to the corresponding one of the first slits 8.

The contact point M, while being placeable at the boundary of the first portion 2d and the second portion 2e, may be positioned in the second portion 2e. Expressed differently, in the second direction y, a region of the metal film bearing the second slits 9 corresponds to the second portion 2e, and part of the first slit 8 may be positioned within the second portion 2e.

In the first direction x, it is defined that the contact point in the first end N1-to-contact point M direction in each single first slit 8 is located on a positive side in the first direction, and the first end in the contact point M-to-first end N1 direction, which is opposite to the first end N1-to-contact point M direction, in each single first slit 8 is located on a negative side in the first direction.

Each single second slit 9 includes an oblique slit 9a at an angle of θ2 to the first side faces 3a and 3b. The angle of is greater than 0°, and less than 90°. Each single second slit 9 includes a second end N2 which is located away from the insulation margin 6 relative to the contact point M, and also located on the negative side in the first direction x relative to the contact point M. That one of two second slits 9 disposed adjacent to each other in the first direction x which is located on the positive side in the first direction x includes the second end N2 positioned in alignment with the first end N1 of the first slit 8 which is continuous with the other second slit 9 located on the negative side in the first direction x, or positioned on the negative side in the first direction x beyond the first end N1 in the first direction x.

In one embodiment shown in FIG. 3, the second slit 9 is formed as the oblique slit 9a at an angle of θ2 to the first side faces 3a and 3b. The angle of θ2 is greater than 0°, and less than 90°. The first side faces 3a and 3b are disposed in parallel to the first direction x. In FIG. 3, θ2 represents the angle which the second slit 9 forms with alternate long and short dashed lines parallel to the first direction x.

Each single first film segments 2di is electrically connected to the corresponding one of the second film segments 2ei at a junction 11.

Figure 4:
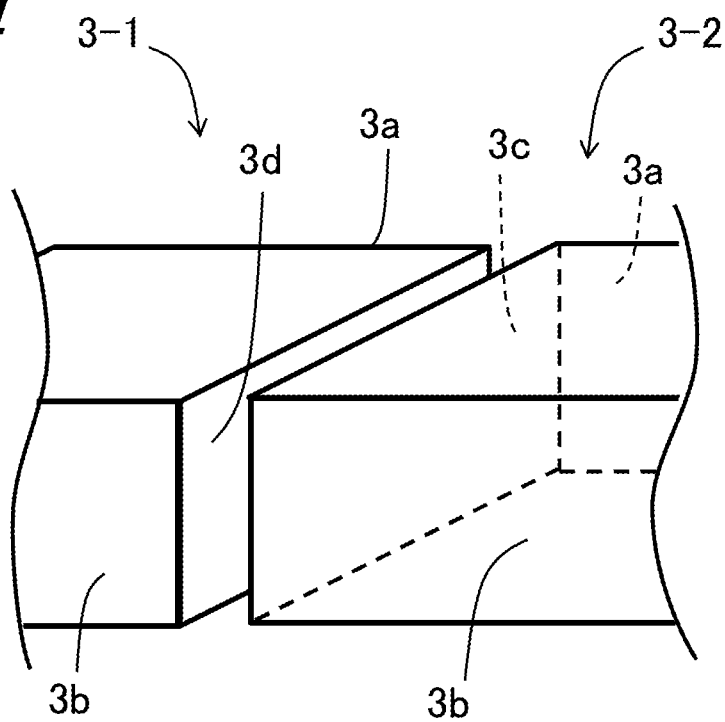
FIG. 4 is a perspective view for explaining how a laminate is to be cut.

For example, as shown in FIG. 3, the metal film 2 is cut along a broken line S in the second direction y. FIG. 4 is a perspective view showing two main body portions 3-1 and 3-2 obtained by cutting a laminate. The laminate shown in FIG. 4 contains the metal film 2 shown in FIG. 3. A cut surface of the left-hand main body portion 3-1 as seen in FIG. 4 constitutes the second side face 3d, whereas a cut surface of the right-hand main body portion 3-2 as seen in FIG. 4 constitutes the second side face 3c.

As shown in FIG. 3, the metal film 2 on the left of the broken line S, i.e. a location of cutting S, lies at the second side face 3d of the main body portion 3-1, whereas the metal film 2 on the right of the location of cutting S lies at the second side face 3c of the main body portion 3-2. The first slit 8 is formed at an angle of θ1 to the second side faces 3c and 3d, and the second end N2 of one second slit 9 is positioned in alignment with the first end N1 of the first slit 8 which is continuous with the other second slit 9 located on the negative side in the first direction x, or positioned on the negative side in the first direction x beyond the first end N1 in the first direction x. This permits electrical isolation between the external electrode 4 and each of that part of the main body portion 3-1 indicated by an arrowed double line P1 and that part of the main body portion 3-2 indicated by an arrowed double line P2. In FIG. 3, θ1 represents the angle which the first slit 8 forms with alternate long and short dashed lines parallel to the broken line S.

In this embodiment, with respect to the angle of θ1, a value of tan (θ1) falls in the range of 0.15 or more and 0.35 or less. Fulfilling the condition where the value of tan (θ1) is greater than or equal to 0.15 achieves higher level of insulation at the cut surface, i.e. the second side face 3c, 3d. Alternatively, the value of tan (θ1) may be greater than or equal to 0.27. Neither of the metal film 2 connected to the part P1 at the second side face 3d of the main body portion 3-1 and the metal film 2 connected to the part P2 at the second side face 3c of the main body portion 3-2 is conducive to the setting-up of capacitance. With this in view, the area of such a metal film 2 unconducive to the setting-up of capacitance can be reduced by fulfilling the condition where the value of tan (θ1) is less than or equal to 0.35.

Two adjacent second slits 9 as projected on the first side face include an overlap. The length of the overlap of these second slits 9 is designated by d1. Given that the spacing between adjacent first slits 8 in the first direction x is d2, then d1 may be greater than d2. Moreover, given that the length of the first slit 8 in the first direction x is w1, then d1 may be greater than w1. Fulfilling the condition where d1 is greater than d2 and w1 allows the second end N2 of one second slit 9 to lie on the negative side in the first direction x beyond the first end N1 of the first slit 8 which is continuous with the other second slit 9 located on the negative side in the first direction x.

As shown in FIG. 3, the metal film 2 may further include a continuous portion 2c, which is a slit-free continuous unbroken portion extending in the first direction x, located on the side of the second portion 2e which is opposite to the first portion 2d. The placement of the continuous portion 2c is optional. With the continuous portion 2c provided, the metal film 2 is electrically connected at the continuous portion 2c to the external electrode 4. On the other hand, without the continuous portion 2c, the second film segments 2ei of the metal film 2 are each electrically connected to the external electrode 4.

In the first direction x, the length of a single second slit 9 may be greater than the sum of the length of a single first slit 8 and the spacing d2 between adjacent first slits 8.

Moreover, in the process of forming a laminate by winding the elongated first and second metallized films 5a and 5b in stacking arrangement around an annular winding core, the metallized film 5 may become creased. The metallized film 5 is prone to include creases especially when it is provided with slits parallel to the first direction x and/or the second direction y, or equivalently, especially when θ1 and/or θ2 stand at 0°. The first portion 2d provided with the first slits 8, in particular, constitute the largest proportion of the area of the metallized film 5, and hence, if the first slits 8 of the first portion 2d are parallel to the second direction y, many creases are likely to appear in the metallized film 5.

In this regard, where θ1 and θ2 are greater than 0°, or equivalently, where the first slit 8 and the second slit 9 are inclined with respect to each of the first direction x and the second direction y, in the process of winding up the metallized film 5, the tension placed on the metallized film 5 is caused to escape obliquely relative to the first direction x in which the film is wound up, thus reducing generation of creases.

With respect to the angle of θ2, a value of tan (θ2) may fall in the range of 0.01 or more and 0.45 or less. Fulfilling the condition where the values of tan (θ1) and tan (θ2) are each greater than or equal to 0.01 reduces crease generation.

In the second direction y, the length of the first slit 8 may be greater than or equal to 50% and less than or equal to 80% of the length of the metal film 2. Fulfilling the condition where the ratio of the length of the first slit 8 to the length of the metal film 2 is greater than or equal to 50% can achieve higher level of insulation at the second side face 3c, 3d, and fulfilling the condition where the ratio is less than or equal to 80% can achieve a reduced area of the metal film 2 unconducive to the setting-up of capacitance.

The second film segment 2ei may be greater than or equal to 200 μm in width on the average. Fulfilling the condition where the average width of the second film segment 2ei is greater than or equal to 200 μm makes the second film segment 2ei resistant to a rupture caused by electrical short circuit.

The described specifics, including the arrangement of the first slits 8 and the second slits 9, that is; the range of tan (θ1) and the range of tan (θ2) and the positioning of the first end N1 and the second end N2, the explanation of d1 and d2, the proportion of the first portion 2d, and the width of the second film segment 2ei, hold true for the following embodiments. In what follows, like constituent components bear similar reference signs, and overlapping descriptions may be omitted.

Figure 5:
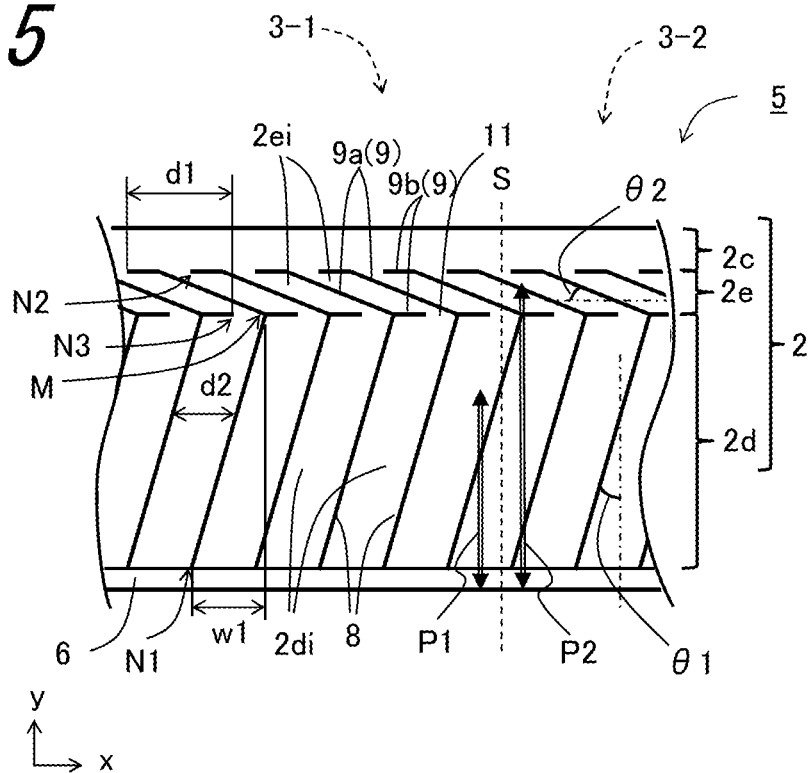
FIG. 5 is a plan view showing an example of the metallized film.

As shown in FIG. 5, the second slit 9 may further include a slit segment 9b extending from an end of the oblique slit 9a in the first direction x. The second slit 9 shown in FIG. 5 includes slit segments 9b disposed one at each end of the oblique slit 9a. That is, the second slit 9 shown in FIG. 5 can be said to be comprised of three rectilinear slits.

While the second slit 9 is illustrated as including the slit segments 9b connected one to each end of the oblique slit 9a in FIG. 5, the second slit 9 may be configured so that only one of the left-hand end and the right-hand end of the oblique slit 9a, as seen in FIG. 5, is provided with the slit segment 9b.

In FIG. 5, the oblique slit 9a is connected at the right-hand end thereof to the first slit 8, and thus the contact point M is located at the right-hand end of the oblique slit 9a. One of the opposite slit segments 9b extends from the contact point M corresponding to the right-hand end of the oblique slit 9a in the first direction x. With the contact point M defined as a base point, of the first slit 8, the oblique slit 9a, and the one slit segment 9b that are contiguous to one another at the contact point M, the first slit 8 and the oblique slit 9a extending from the base point are oriented on the same side in the first direction x, i.e. the negative side in the first direction x as seen in FIG. 5. On the other hand, the slit segment 9b extending from the base point is opposite in orientation direction to the first slit 8 and the oblique slit 9a, that is; it is oriented toward the positive side in the first direction x. In other words, the slit segment 9b extending from the contact point M protrudes toward the opposite side from the side toward which the first end N1 of the first slit 8 is located with respect to the contact point M. The slit segment 9b extending from the contact point M may include a portion protruding from the contact point M toward the same side as the side on which the first end N1 of the first slit 8 is located with respect to the contact point M. For example, in FIG. 5, the slit segment 9b extending from the contact point M on the positive side in the first direction x may include a portion protruding from the contact point M on the negative side in the first direction x. The portion of the slit segment 9b protruding from the contact point M on the negative side in the first direction x may be shorter than the portion of the slit segment 9b protruding from the contact point M on the positive side in the first direction x. In FIG. 5, an end of the slit segment 9b extending from the contact point M on the positive side in the first direction x located on the positive side in the first direction x is defined as a third end N3.

The slit segment 9b connected to the left-hand end of the oblique slit 9a may be extended on the negative side in the first direction x. Where the slit segment 9b connected to the left-hand end of the oblique slit 9a extends on the negative side in the first direction x, that is; where the slit segment 9b and the oblique slit 9a are oriented toward the same side, the length d1 of the overlap of adjacent second slits 9 as projected on the first side face can be increased.

Figure 6:
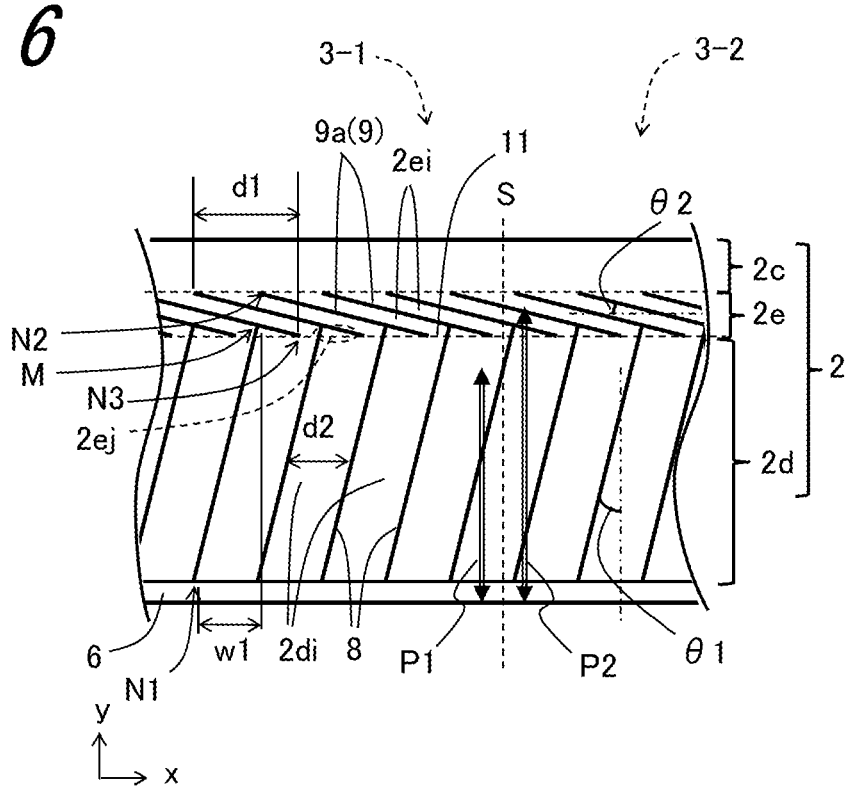
FIG. 6 is a plan view showing another example of the metallized film.

The second slit 9 may be connected to the first slit 8 at a contact point M intermediate the ends of the oblique slit 9a. A second slit 9 shown in FIG. 6 is comprised of a single rectilinear oblique slit 9a, and is connected to the first slit 8 at a contact point M intermediate ends thereof. In FIG. 6, the third end N3 corresponds to the end of the oblique slit 9a located on the positive side in the first direction x. Each single first slit 8 may be intersected by the corresponding one of the second slits 9. This arrangement can increase the length of the part P1, and thus can achieve higher level of insulation at both sides of the location of cutting S.

As shown in FIG. 6, the second portion 2e may include a third portion 2ej defined by the second slit 9 and the first slit 8. The dashed ellipse shown in FIG. 6 roughly indicates the third portion 2ej. The third portion 2ej may be located on the opposite side to the side toward which the first film segment 2di and the second film segment 2ei extending from the junction 11 are oriented. That is, the third portion 2ej may be located on the positive side in the first direction x. The third portion 2ej does not necessarily have to extend in the first direction x.

In each of the metal films 2 shown in FIGS. 3, 5, and 6, the first slit 8 is connected at the contact point M to the oblique slit 9a. In the case shown in FIG. 5 where the second slit 9 includes the slit segment 9b connected to the right-hand end of the oblique slit 9a, the first slit 8 may be connected at the contact point M to the slit segment 9b. The slit segment 9b connected with the first slit 8 may be extended from the right-hand end of the oblique slit 9a on the positive side as shown in FIG. 5, or the negative side in the first direction x, or may be extended therefrom on a negative side in the second direction y.

Figure 7:
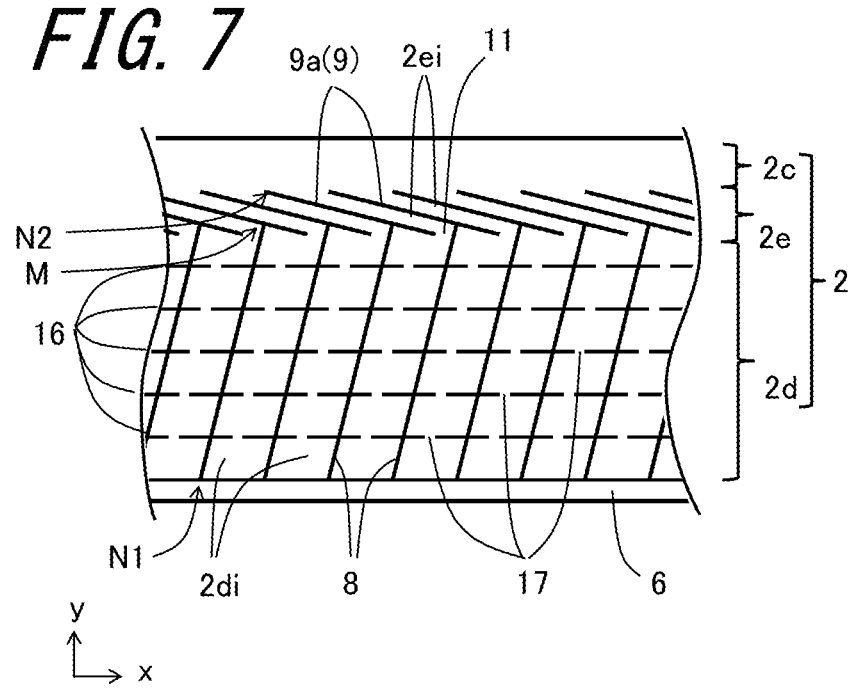
FIG. 7 is a plan view showing still another example of the metallized film.

As shown in FIG. 7, the first film segment 2di may be divided into subsegments by third slits 16 extending in the first direction x. A fuse 17 provides electrical connection between the subsegments obtained by division of the first film segment 2di by the third slits 16 extending in the first direction x.

While, in FIG. 7, there is shown a case where the third slit 16 is provided in the metal film 2 shown in FIG. 6, the third slit 16 may be provided in the metal film 2 shown in FIG. 3 or that shown in FIG. 5.

While, in each of FIG. 3 and FIGS. 5 to 7, there is shown a case where the first slit 8 extends from the first end N1 at the lower left to the contact point M at the upper right as seen in the drawings, the first slit 8 may extend from the first end N1 at the lower right to the contact point at the upper left as seen in the drawings. In other words, each of the arrangements shown in FIG. 3 and FIGS. 5 to 7 may be horizontally flipped.

Figure 8:
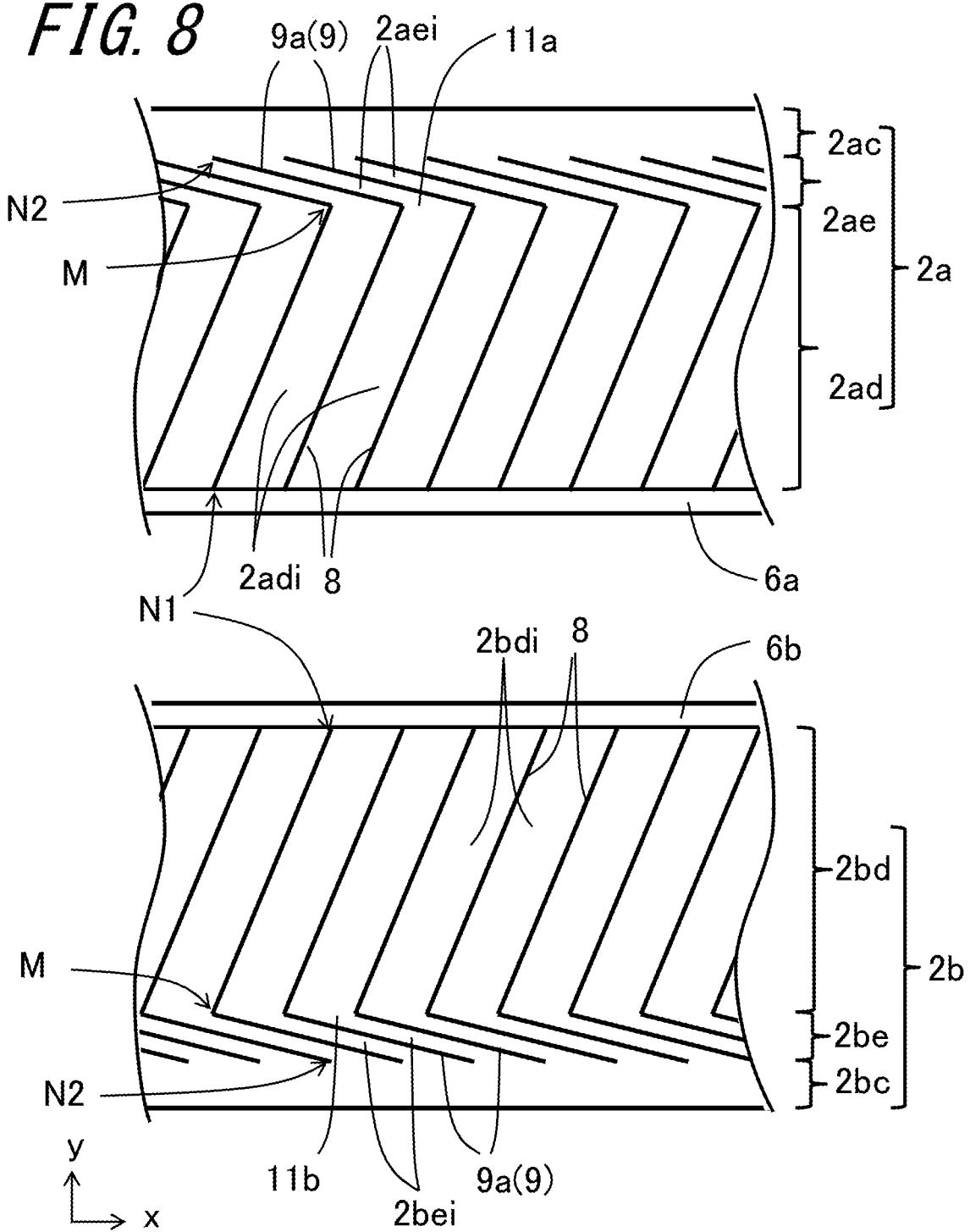
FIG. 8 is a plan view showing an arrangement of a first metal film and a second metal film.

FIG. 8 is a plan view showing an arrangement of the first metal film 2a and the second metal film 2b of the laminate including the metal film 2 shown in FIG. 3. The first metallized film 5a illustrated in the upper part of FIG. 8 and the second metallized film 5b illustrated in the lower part of FIG. 8 are laminated together so as to be slightly displaced in relation to each other in the second direction y. A continuous portion 2ac of the first metal film 2a overlaps with an insulation margin 6b of the second metallized film 5b. A continuous portion 2bc of the second metal film 2b overlaps with an insulation margin 6a of the first metallized film 5a.

In FIG. 3, the arrowed line P1 on the left of the location of cutting S is shorter than the arrowed line P2 on the right of the location of cutting S. Accordingly, a region electrically isolated from the external electrode 4, i.e. an insulated region in the second side face 3d on the left of the location of cutting S is narrower than an insulated region in the second side face 3c on the right of the location of cutting S. That is, in such a case as shown in FIG. 3 where the first film segment 2di and the second film segment 2ei are each extended from the junction 11 so as to be oriented leftward, without respect to the whereabouts of the location of cutting S, the second side face 3d on the left of the location of cutting S is prone to be lower in insulation level than the second side face 3c on the right of the location of cutting S. On the other hand, where the first film segment 2di and the second film segment 2ei are each extended from the junction 11 so as to be oriented rightward, without respect to the whereabouts of the location of cutting S, the second side face 3c on the right of the location of cutting S is prone to be lower in insulation level than the second side face 3d on the left of the location of cutting S.

The first end N1-to-contact point M direction in the first metal film 2a and the first end N1-to-contact point M direction in the second metal film 2b may be oriented toward the same side in the first direction. In this case, the first metal film 2a and the second metal film 2b are arranged in such a manner that the sides where better insulation is likely, i.e. the sides with the part P2 shown in FIG. 3 overlaps with each other, and also the sides where poor insulation is likely, i.e. the sides with the part P1 shown in FIG. 3 overlaps with each other. Consequently, the side with the part P2 in the main body portion exhibits high insulation level. However, the other side with the part P1 is prone to exhibit low insulation level.

In this regard, as shown in FIG. 8, the first end N1-to-contact point M direction in the first metal film 2a and the first end N1-to-contact point M direction in the second metal film 2b may be oppositely oriented. In other words, the first metal film 2a and the second metal film 2b may be arranged in such a manner that a second film segment 2aei and a second film segment 2bei are identical in form, provided that the second film segment 2aei is rotated one-half of a turn about z-axis corresponding to the third direction z. This allows the part P2, where better insulation is likely in the first metal film 2a or the second metal film 2b, to lie on each of the second side face 3c and the second side face 3d of the main body portion 3, and thus permits improvement in insulation at both of the second side face 3c and the second side face 3d.

Figure 9:
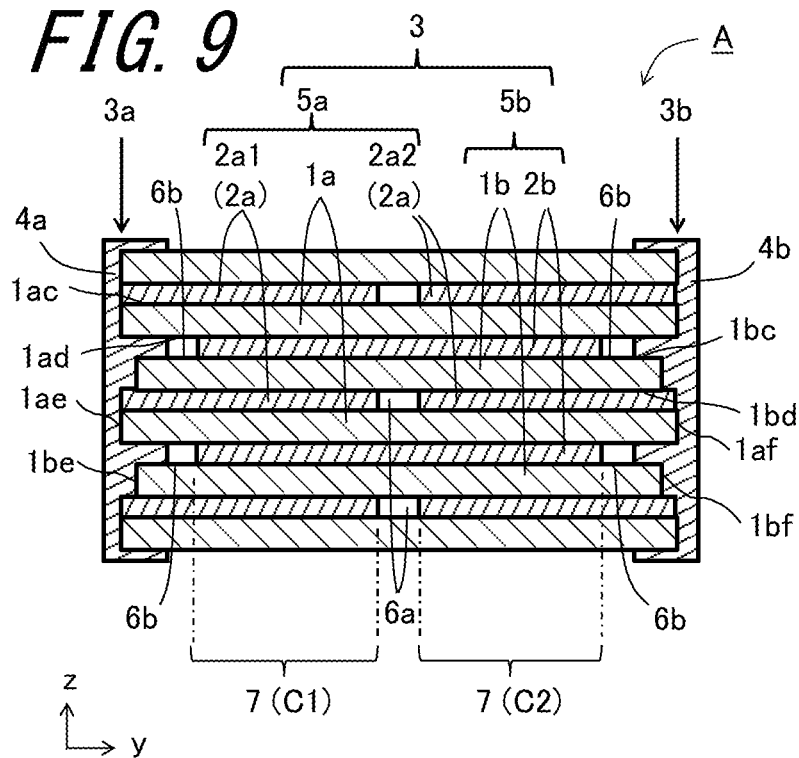
FIG. 9 is a sectional view showing another example of the film capacitor shown in FIG. 1 taken along the line II-II in FIG. 1.

FIG. 9 is a sectional view showing an example of the film capacitor A of series connection type. In the main body portion 3 of the film capacitor shown in FIG. 9, two capacitance members C1 and C2 are connected in series with each other.

The first metal film 2a includes a left-hand first metal film 2a1 and a right-hand first metal film 2a2, as viewed in FIG. 9. That is, the first metal film 2a includes two first metal films 2a1 and 2a2 juxtaposed in the second direction y. The first metal film 2a1 is electrically connected to the first external electrode 4a at the left-hand first side face 3a of the main body portion 3. The first metal film 2a2 is electrically connected to the second external electrode 4b at the right-hand first side face 3b of the main body portion 3.

The first metallized film 5a includes, on a central area thereof in the second direction y, the insulation margin 6a extending continuously in the first direction x. The insulation margin 6a is a portion where the first face 1ac of the first dielectric film 1a is not covered with the metal film 2. The insulation margin 6a permits electrical isolation between the first metal film 2a1 and the first metal film 2a2.

The second metallized film 5b includes, on each end part thereof in the first direction x, the insulation margin 6b extending continuously in the first direction x. The insulation margin 6b is a portion where the first face 1bc of the second dielectric film 1b is not covered with the metal film 2. The second metal film 2b is electrically connected to neither of the first external electrode 4a and the second external electrode 4b.

One or more sets of the first metallized film 5a and the second metallized film 5b are laminated together in the third direction z as shown in FIG. 9.

In the series connection-type film capacitor A, the first capacitance member C1 and the second capacitance member C2 are connected in series with each other. The first capacitance member C1 is formed in an effective region 7 where the first metal film 2a1 and the second metal film 2b are arranged with the dielectric film 1a or the dielectric film 1b sandwiched in between. The second capacitance member C2 is formed in an effective region 7 where the first metal film 2a2 and the second metal film 2b are arranged with the dielectric film 1a or the dielectric film 1b sandwiched in between.

Figure 10:
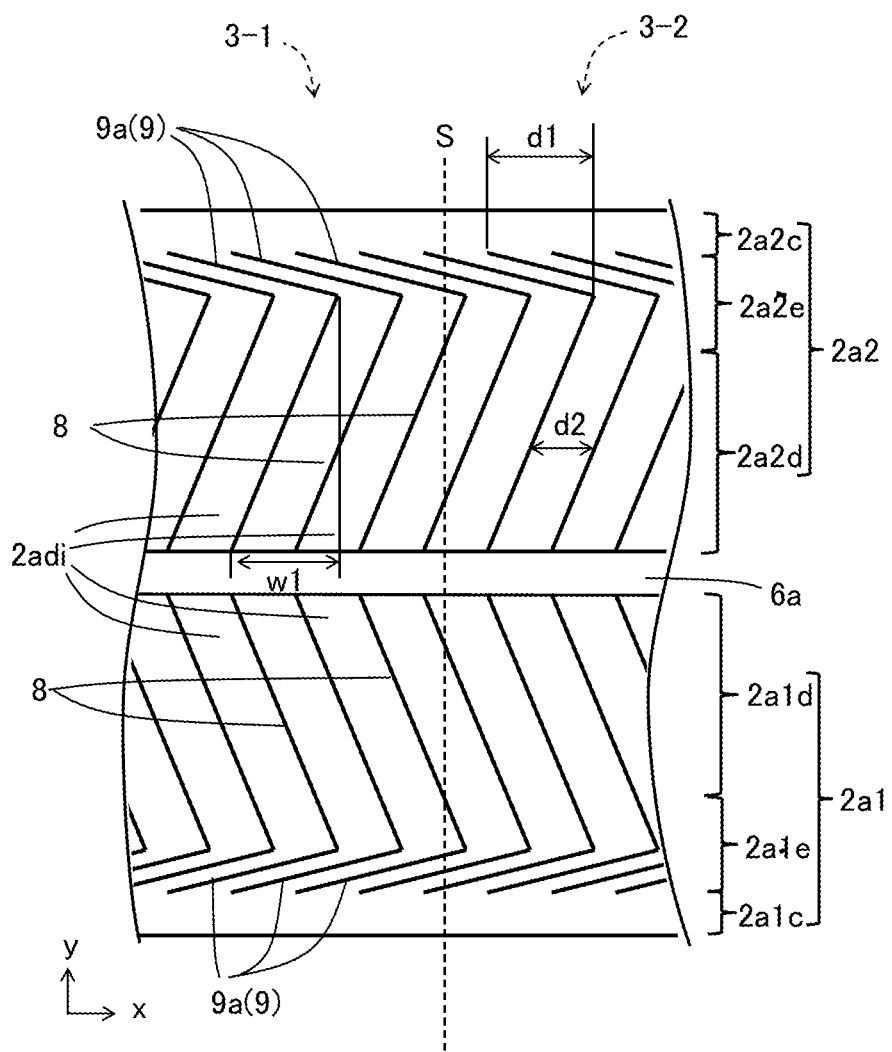
FIG. 10 is a plan view of a first metallized film used in the example shown in FIG. 9.

FIG. 10 is a view showing an example of the first metallized film 5a. For the case of the series connection-type film capacitor, the first metal film 2a1 includes a first portion 2a1d adjacent to the insulation margin 6a, and a second portion 2a1e located on the side of the first portion 2a1d which is opposite to the insulation margin 6a. Moreover, the second metal film 2a2 includes a first portion 2a2d adjacent to the insulation margin 6a, and a second portion 2a2e located at the side of the first portion 2a2d which is opposite to the insulation margin 6a.

Figure 11:
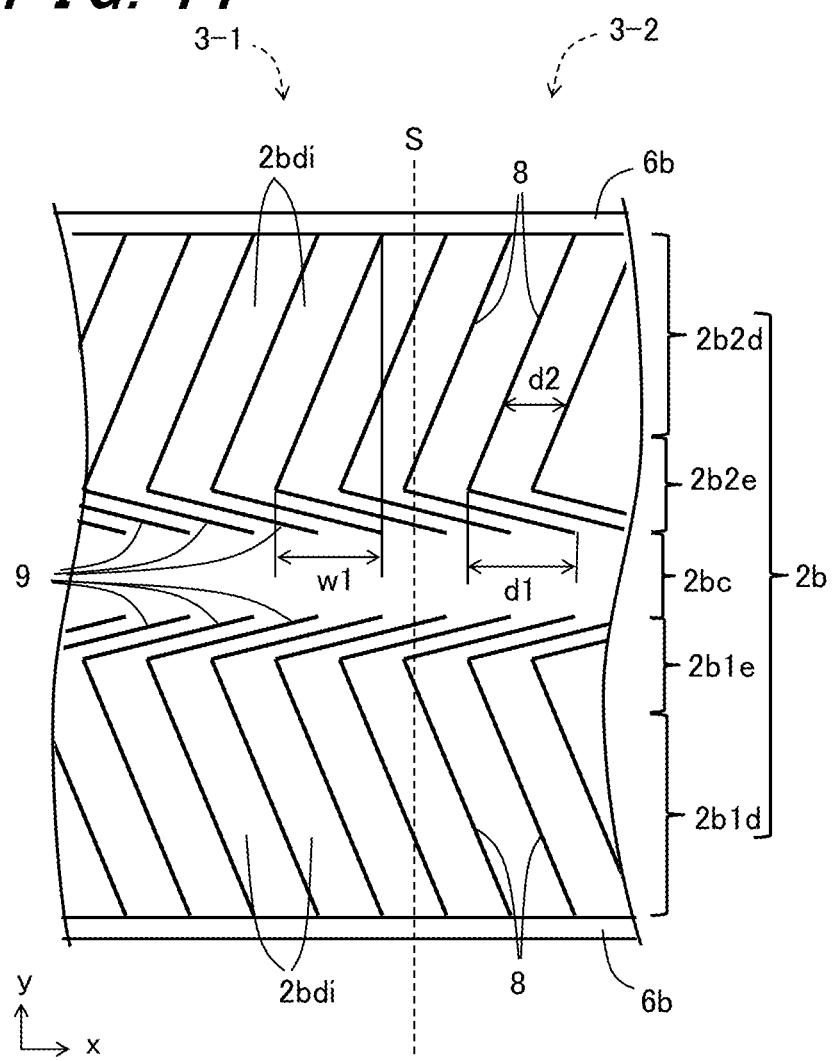
FIG. 11 is a plan view of a second metallized film used in the example shown in FIG. 9.

FIG. 11 is a view showing an example of the second metallized film 5b in association with the first metallized film 5a shown in FIG. 10. The second metal film 2b includes a first portion 2b1d adjacent to one insulation margin 6b and a second portion 2b1e located on the side of the first portion 2b1d which is opposite to the insulation margin 6b, which are illustrated in the lower part of FIG. 11, and also includes a first portion 2b2d adjacent to the other insulation margin 6b and a second portion 2b2e located on the side of the first portion 2b2d which is opposite to the insulation margin 6b, which are illustrated in the upper part of FIG. 11.

Also in the first portions 2a1d, 2a2d, 2b1d, and 2b2d, and the second portions ta1e, 2a2e, 2b1e, and 2b2e of the series connection-type film capacitor A, the application of the earlier described arrangement of the first slits 8 and the second slits 9 permits improvement in insulation at the second side face 3c and the second side face 3d, i.e. the cut surface.

As shown in FIG. 10, the first metal film 2a1 and the first metal film 2a2 may include a continuous portion ta1c and a continuous portion 2a2c, respectively, each in the form of a slit-free continuous unbroken portion extending in the first direction x, located on the side of the second portion 2e which is opposite to the first portion 2d. The placement of the continuous portion is optional. With the continuous portions 2a1c and 2a2c provided, the metal film 2 is electrically connected at the continuous portion 2a1c, 2a2c to the external electrode 4. On the other hand, without the continuous portions 2a1c and 2a2c, the second film segments 2ei are each electrically connected to the external electrode 4.

As shown in FIG. 11, the second metal film 2b may include a continuous portion 2bc, which is a slit-free continuous unbroken portion extending in the first direction x, located between the second portion 2b1e and the second portion 2b2e. The placement of the continuous portion is optional.

In FIGS. 10 and 11, there is shown a case where the first end N1-to-contact point M direction in the first metal film 2a1 and the first end N1-to-contact point M direction in the first metal film 2a2 are oriented toward the same side in the first direction x. Alternatively, the first end N1-to-contact point M direction in the first metal film 2a1 and the first end N1-to-contact point M direction in the first metal film 2a2 may be oppositely oriented in the first direction x. Likewise, the upper-side first end N1-to-contact point M direction in the second metal film 2b and the lower-side first end N1-to-contact point M direction in the second metal film 2b may be oppositely oriented in the first direction x.

The first end N1-to-contact point M direction in the first metal film 2a1 constituting the first capacitance member C1 and the lower-side first end N1-to-contact point M direction in the second metal film 2b constituting the first capacitance member C1 may be oppositely oriented in the first direction x. Likewise, the first end N1-to-contact point M direction in the first metal film 2a2 constituting the second capacitance member C2 and the upper-side first end N1-to-contact point M direction in the second metal film 2b constituting the second capacitance member C2 may be oppositely oriented in the first direction x. This arrangement permits improvement in insulation at both sides of the location of cutting S in the laminate.

For example, the metal film 2 is made of a material comprised predominantly of aluminum. For example, the metal film 2 is on the average 14 to 70 nm thick. The metal film 2 in the form of a thin layer which measures 14 to 70 nm in thickness (average thickness) adheres firmly to the dielectric film 1, and thus becomes rip-resistant even when the metallized film 5 is subjected to tension. Thus, a sufficient effective area conducive to the setting-up of capacitance can be attained. Moreover, setting the average thickness of the metal film 2 to be greater than or equal to 14 nm reduces a decrease in capacitance due to dielectric breakdown, and also achieves higher breakdown-voltage levels. Setting the average thickness of the metal film 2 to be less than or equal to 70 nm permits retention of self-healing performance, and also achieves higher breakdown-voltage levels. An evaluation of the average thickness of the metal film 2 is made through observation of a section of the ion milling-treated metallized film 5 under a scanning electron microscope (SEM).

The metal film 2 may include a so-called heavy edge structure close to the junction with the external electrode 4. The part of the metal film 2 close to the junction with the external electrode 4 refers to a part of the metal film 2 close to the first side 1e of the dielectric film 1. For example, the heavy edge structure is obtained by designing the part of the metal film 2 close to the junction with the external electrode 4 to be relatively large in thickness and low in resistance as compared with a part thereof located within the effective region 7 where the first metal film 2a and the second metal film 2b overlaps with each other. The heavy edge structure-bearing part of the metal film 2 close to the junction with the external electrode 4 may also be hereinafter referred to as "heavy edge portion".

For example, the film thickness of that part of the metal film 2 close to the junction with the external electrode 4 is at least twice such a film thickness as to achieve self-healing performance, and more specifically, the film thickness is greater than or equal to 20 nm. At the heavy edge portion, the metal film 2 may be made with film thickness ranging downwardly from 80 nm. The heavy edge portion of the metal film 2 enhances electrical connection between the metal film 2 and the external electrode 4. Moreover, the metal film 2 is electrically connected at the low-resistance heavy edge portion to the external electrode 4, thus reducing the equivalent series resistance (ESR) of the film capacitor A.

In the film capacitor A, the heavy edge portion of the first metallized film 5a overlaps with the insulation margin 6b of the second metallized film 5b, and the heavy edge portion of the second metallized film 5b overlaps with the insulation margin 6a of the first metallized film 5a. For example, the width of the heavy edge portion in the second direction y falls in the range of 0.5 mm or more and 3 mm or less.

Examples of the insulating resin material used for the dielectric film 1 include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cycloolefin polymer (COP). Polyarylate (PAR), in particular, acquires a high breakdown voltage level.

For example, the dielectric film 1 may be greater than or equal to 0.7 μm, and less than or equal to 4 μm in average thickness. Setting the average thickness of the dielectric film 1 to be greater than or equal to 0.7 μm allows the metal film 2 to have both slipping property and high breakdown-voltage levels. Setting the average thickness of the dielectric film 1 to be less than or equal to 4 μm increases capacitance.

The following describes an example of how to produce the film capacitor A. At the first step, the dielectric film 1 is prepared. For example, the dielectric film 1 is obtained by applying a resin solution, which has been prepared by dissolving an insulating resin in a solvent, to the surface of a base film made of polyethylene terephthalate (PET), then shaping the resin coating into a sheet, and drying the sheet until the solvent evaporates. Any known film-forming technique selected from among a doctor blade method, a die coater method, a knife coater method, etc. may be used for the film formation. Examples of the solvent for use in the film formation include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, cyclohexane, and an organic solvent containing a mixture of two or more substances selected from among those given above. Alternatively, the dielectric film may be obtained by subjecting a resin film produced by melt extrusion to drawing process.

While the dielectric film 1 may be comprised solely of the above-described insulating resin, other materials may be contained therein. Examples of other constituent elements than the resin that may be contained in the dielectric film 1 include such organic solvents as mentioned above and inorganic fillers. For example, inorganic oxide such as alumina, titanium oxide, or silicon dioxide, inorganic nitride such as silicon nitride, and glass may be used for the inorganic filler. The use of an inorganic filler made of a material including high relative permittivity, such as perovskite-structured composite oxide, in particular, improves the relative permittivity of the dielectric film 1 as a whole, and permits a reduction in the size of the film capacitor A. Moreover, the inorganic filler may be subjected to surface treatment such as silane coupling treatment or titanate coupling treatment. The surface-treated inorganic filler is highly compatible with the resin.

The dielectric film 1 may be made as a composite film including the content of such an inorganic filler as described above of less than 50% by mass and a resin content of greater than or equal to 50% by mass. The dielectric film 1 in composite film form provides advantageous effects such as improvement in relative permittivity on the strength of the inorganic filler, while maintaining the flexibility of the resin. The inorganic filler may range from 4 nm to 1000 nm in size (average particle size).

After separating the resulting dielectric film 1 from the base film, a metal component such as aluminum (Al) is vapor-deposited onto one surface of the dielectric film 1 to form the metal film 2. The metallized film 5 is thus obtained. Examples of the way of defining patterns in the metal film 2 include an oil-assisted transfer patterning method and a laser patterning method. According to the oil-assisted transfer patterning method, a metal component is vapor-deposited onto the dielectric film 1 with an oil mask placed thereon. According to the laser patterning method, after vapor deposition of a metal component onto the dielectric film 1, part of the metal film 2 is volatilized by a laser.

The heavy edge structure is formed by masking the metallized film 5 except for the area where the heavy edge portion is to be formed as described above, and vapor-depositing, for example, zinc (Zn) onto the mask-free area of the above-described vapor-deposited metal component. The vapor deposition is carried out in such a manner that the thickness of the vapor-deposited film for forming the heavy edge portion is one to three times the thickness of the above-described vapor-deposited metal component.

The resulting metallized film 5 may be slit into a film of predetermined width. As one set of two metallized films, the first metallized film 5a and the second metallized film 5b are laminated together so as to be slightly displaced in relation to each other in the width direction, i.e. the second direction y. The resulting stack is wound around an annular winding core. The wound laminate is cut along the second direction y to obtain the main body portion 3 of the film capacitor A. The annular winding core may also be hereinafter called "drum".

As the external electrodes 4a and 4b, Metallikon electrodes are formed on both end faces of the resulting main body portion 3 in the second direction y, i.e. the first side face 3a and the first side face 3b. The film capacitor A is thus obtained. The external electrode 4 may be formed by means of metallic spraying, sputtering, plating, or otherwise. The external electrode 4 may be formed on the yet-to-be-cut laminate. After the laminate is provided with the external electrode 4, the resulting laminate is cut.

The outer surface of the main body portion 3 provided with the external electrode 4 may be covered with a non-illustrated exterior member.

In addition to the aforenamed aluminum (Al), other metal material such as zinc (Zn) and an alloy material may be used for the external electrode 4.

As the material of construction of the Metallikon electrode, use can be made of at least one metal material selected from among zinc, aluminum, copper, and solder.

Figure 12:
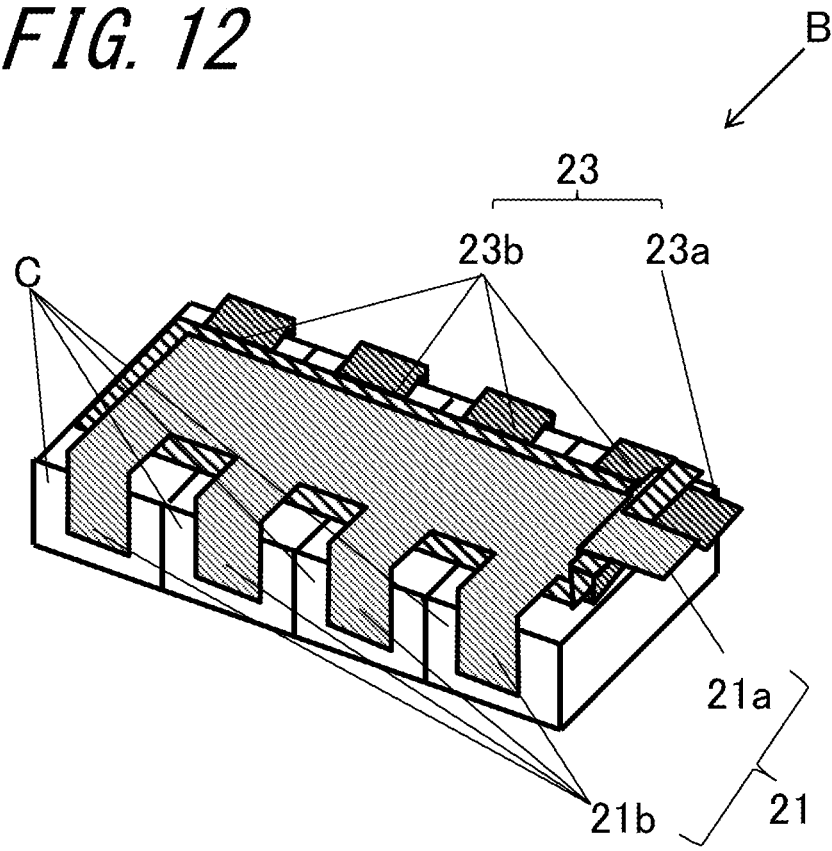
FIG. 12 is a perspective view schematically showing a combination type capacitor.

FIG. 12 is a perspective view schematically showing an example of a combination type capacitor. For ease in understanding the structure of the combination type capacitor, the illustration of a case and an exterior resin for covering the surface of the capacitor is omitted from FIG. 12. The combination type capacitor B includes a plurality of film capacitors C connected in parallel with each other via a pair of bus bars 21 and 23. The bus bar 21 includes a terminal portion 21a for external connection and an extraction terminal portion 21b, and the bus bar 23 includes a terminal portion 23a for external connection and a extraction terminal portion 23b. The extraction terminal portions 21b and 23b are each connected to the corresponding external electrode of the film capacitor C.

When the combination type capacitor B includes the above-described film capacitor A including the film capacitor C, it is possible to obtain a combination type capacitor having excellent insulation performance.

The combination type capacitor B may include at least one film capacitor A, or may include two or more film capacitors A. The combination type capacitor B includes an arrangement of a plurality of film capacitors C, for example, an arrangement of four film capacitors C as shown in FIG. 11, with the bus bars 21 and 23 attached via joining materials to the external electrodes provided at both ends of the main body portion 3.

The combination type capacitor B may be constructed of a side-by-side arrangement of film capacitors as shown in FIG. 12, or a stack of film capacitors. Moreover, the film capacitors C may be aligned so that the direction of arrangement of the external electrodes, i.e. the second direction y conforms to a vertical direction.

The film capacitor A, as well as the combination type capacitor B, may be built as a resin-molded, or case-molded capacitor. This is achieved by placing the capacitor in a case, and thereafter filling a space in the case with resin.

Figure 13:
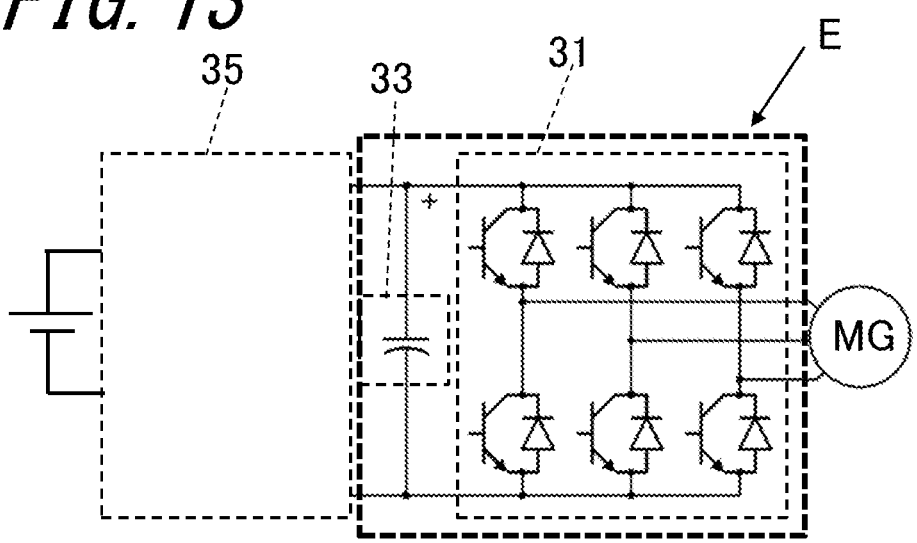
FIG. 13 is a schematic block diagram showing an example of the configuration of an inverter.

FIG. 13 is a schematic block diagram for explaining an example of an inverter. FIG. 13 shows an inverter E for producing alternating current from direct current. As shown in FIG. 13, the inverter E includes a bridge circuit 31 and a capacitance member 33. For example, the bridge circuit 31 includes switching elements such as IGBTs (Insulated gate Bipolar Transistors) and diodes. The capacitance member 33 is interposed between input terminals of the bridge circuit 31 for voltage stabilization. The inverter E includes the above-described film capacitor A as the capacitance member 33.

The inverter E is connected to a booster circuit 35 for boosting DC power voltage. The bridge circuit 31 is connected to a motor generator MG which serves as a drive source.

Figure 14:
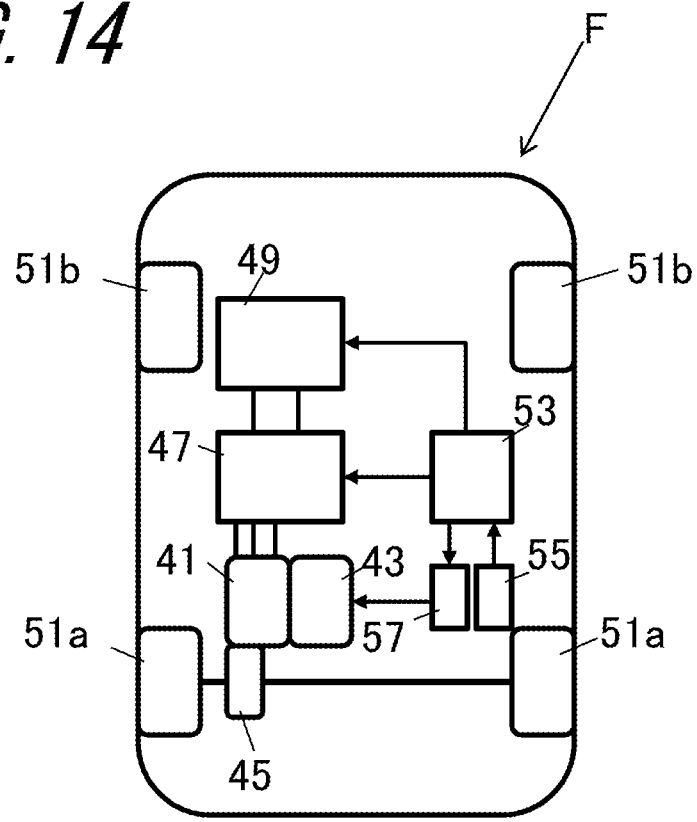
FIG. 14 is a schematic block diagram showing an example of the configuration an electric vehicle.

FIG. 14 is a schematic block diagram showing an electric vehicle. FIG. 14 shows a hybrid electric vehicle (HEV) as an example of the electric vehicle.

The electric vehicle F includes a drive motor 41, an engine 43, a transmission 45, an inverter 47, a power supply or battery 49, front wheels 51a, and rear wheels 51b.

The electric vehicle F yields output via the motor 41 or the engine 43, or both of them, as a drive source. Output from the drive source is transmitted to a pair of right-hand and left-hand front wheels 51a via the transmission 45. The power supply 49 is connected to the inverter 47, and the inverter 47 is connected to the motor 41.

Moreover, the electric vehicle F shown in FIG. 14 includes a vehicle ECU 53 and an engine ECU 57. The vehicle ECU 53 exercises overall control of the electric vehicle F. The engine ECU 57 controls a rotation speed of the engine 43 to drive the electric vehicle F. The electric vehicle F additionally includes driving devices such as an ignition key 55, and a non-illustrated accelerator pedal and a non-illustrated brake, which are operated by a driver or others. Drive signals responsive to the operation of the driving devices by a driver or others are inputted to the vehicle ECU 53. The vehicle ECU 53 outputs instruction signals to the engine ECU 57, the power supply 49, and the inverter 47 as a load based on the drive signals. The engine ECU 57 controls a rotation speed of the engine 43 in response to the instruction signals to drive the electric vehicle F.

The inverter E, i.e. the inverter E including the above-described film capacitor A as the capacitance member 33, is used as the inverter 47 of the electric vehicle F. In such an electric vehicle F, the film capacitor A has a low dissipation factor and suffers little increase in dissipation factor under cycles of charge and discharge. This permits long-term retention of capacitance, and thus achieves long-term reduction of switching noise which occurs in the inverter 47, etc.

The inverter E according to this embodiment can be applied not only to the hybrid electric vehicle (HEV) as described above, but also to various power conversion application products such as an electric vehicle (EV), a fuel cell vehicle, an electric bicycle, a power generator or a solar cell.

EXAMPLES

A dielectric film measuring 3 μm in average thickness was formed from polyarylate (U-100) manufactured by UNITIKA, Ltd. The dielectric film was obtained by dissolving polyarylate in toluene, applying the resulting solution onto a polyethylene terephthalate (PET)-made base film with a coater, shaping the resulting coating into a sheet, and heat-treating the sheet at a temperature of 130° C. to remove toluene.

The resulting dielectric film was separated from the base film. After slitting the dielectric film into a 200 mm- or 130 mm-wide film, a metal film was formed on one surface of the dielectric film by vacuum vapor deposition.

The following describes a way of forming the metal film on the 200 mm-wide dielectric film. With an oil mask placed on the opposite surface of the dielectric film to the surface thereof which was in contact with the base film, a 52 mm-wide Al (aluminum) film was formed at a central part on the dielectric film in a width direction thereof, i.e. the first direction x. The Al film is on the average 20 nm thick. Subsequently, as a heavy edge portion, a 8.8 mm-wide Zn (zinc) film was formed at a widthwise central part on the resulting Al film through metal masking. The Zn film is on the average 40 nm thick.

The dielectric film provided with the metal film was slit at widthwise midportion and ends thereof to obtain a 28 mm-wide metallized film. The resulting metallized film included a 1 mm-wide insulation margin and a 4.4 mm-wide heavy edge portion. The heavy edge portion of the resulting metallized film constitutes a continuation of the metal film.

Figure 15:
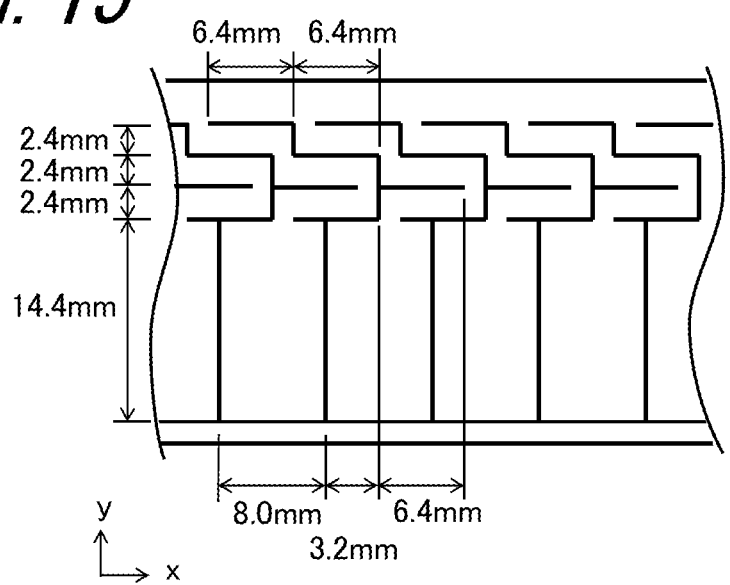
FIG. 15 is a plan view showing the dimensions of the metal film of the metallized film used in the example.
Figure 16:
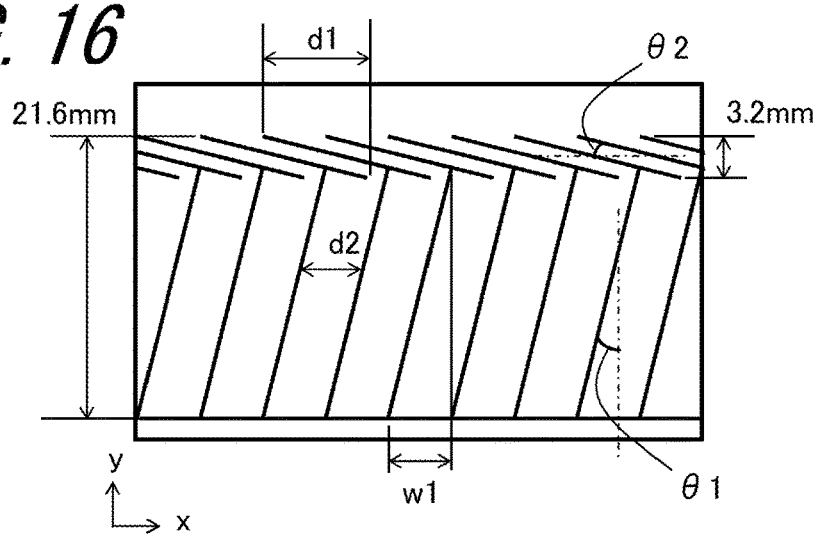
FIG. 16 is a plan view showing the dimensions of the metal film of the metallized film used in the example.
Figure 17:
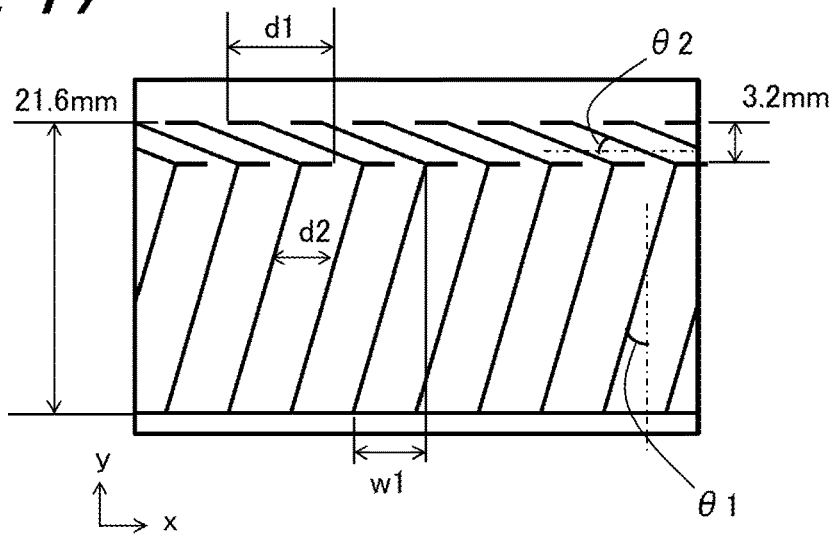
FIG. 17 is a plan view showing the dimensions of the metal film of the metallized film used in the example.

First and second slits were formed in the Al film through oil masking in accordance with one of the patterns respectively shown in FIGS. 15 to 17. The first and second slits will hereinafter be collectively called "pattern". The values of d1, d2, tan (θ1) and tan (θ2) as shown in each drawing are listed in Table 1. In the pattern in use, the second end of one second slit is positioned in alignment with the first end of the first slit which is continuous with an adjacent second slit located on the negative side in the first direction, or positioned on the negative side in the first direction beyond the first end in the first direction.

Sample No. 1 employed the first metallized film including the first metal film including the pattern shown in FIG. 15, and the second metallized film including the second metal film including a pattern obtained by flipping the pattern shown in FIG. 15 horizontally. Patterning has been effected through oil masking. Sample No. 2 employed the first and second metallized films each including the metal film including the pattern shown in FIG. 15. Sample Nos. 3 through 14 employed the first and second metallized films each including the metal film including the pattern shown in FIG. 16. Sample Nos. 15 through 19 employed the first and second metallized films each including the metal film including the pattern shown in FIG. 17. The relationship between the first end N1-to-contact point M direction in the first metal film and the first end N1-to-contact point M direction in the second metal film, that is; the relationship in N1-to-M direction between the first metal film and the second metal film in each of Sample Nos. 1 through 19 is listed in Table 1. Note that each slit is 0.2 mm in width, and "d2" as shown in FIGS. 15 to 17 represents the spacing between adjacent first slits, that is; the center-to-center spacing between adjacent first slits in the width direction.

The first metallized film and the second metallized film were laminated together in such a manner that their respective heavy edge portions were located at opposite ends of the construction in the first direction x, and that their respective heavy edge portions each became a 0.5 mm-long protrusion extending in the second direction y. A wound body including a plurality of annularly connected film capacitors was made from 450 turns of the stack of the first metallized film and the second metallized film, wound around a 200 mm-diameter drum. The first metallized film and the second metallized film were laminated together in such a manner that the dielectric film was sandwiched between the first metal film and the second metal film.

The 130 mm-wide dielectric film was used to form a metallized film including two metal films of different film thickness.

The film thickness of each metal film was determined by observation of a section of the ion milling-treated metallized film under a scanning electron microscope (SEM). It was found out that the thicker metal film had a film thickness of 60 nm, whereas the thinner metal film had a film thickness of 20 nm.

Figure 18:
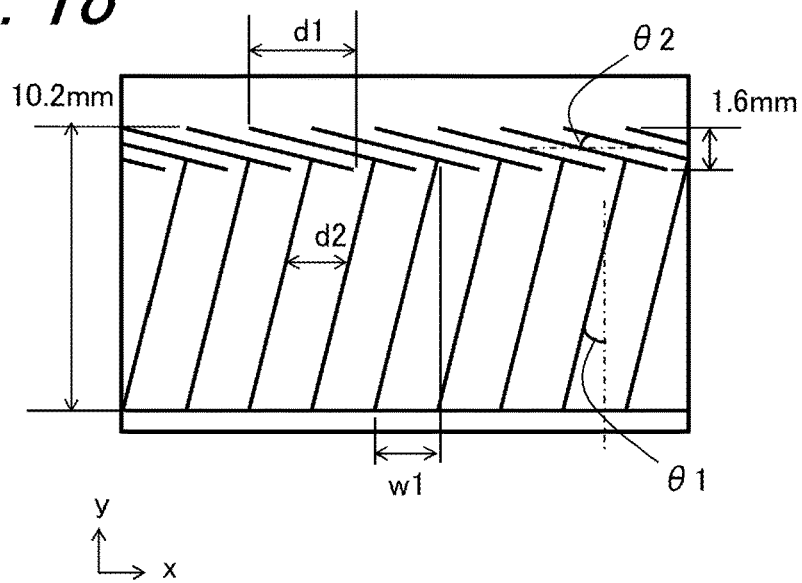
FIG. 18 is a plan view showing the dimensions of the metal film of the metallized film used in the example.

The pattern shown in FIG. 18 was defined in the Al film with oil masking. With a 2 mm-wide oil mask placed at a central part on the dielectric film in the second direction y to leave an insulation margin, a relatively thick metal film was formed as the first metal film at other part than the oil-masked part on the dielectric film. The first metallized film was thus obtained. The first metallized film included a set of the first metal films arranged with the insulation margin sandwiched in between. Moreover, with an oil mask placed at each end part on the dielectric film in the second direction y to leave insulation margins, a relatively thin metal film was formed as the second metal film at other part than the oil-masked part on the dielectric film. The second metallized film was thus obtained.

In Table 2, there are shown the values of d1, d2, w1, tan(θ1), and tan(θ2), and the relationship between the two first metal films in the first end N1-to-contact point M direction, i.e. N1-to-M direction, as well as the relationship in N1-to-M direction between the opposed first and second metal films, in each of Sample Nos. 20 through 22.

The first metallized film and the second metallized film were laminated together, and a wound body including a plurality of annularly connected film capacitors was made from 450 turns of the stack of the first metallized film and the second metallized film, wound around a 200 mm-diameter drum. The first metallized film and the second metallized film were laminated together in such a manner that the dielectric film was sandwiched between the first metal film and the second metal film.

The resulting wound body was cut into pieces 50 mm wide in the second direction y to obtain laminates each serving as a main body portion. The metallized films were checked for creases during the above-described slitting work and the process of winding the film stack around the drum.

Zn (zinc)-arc spraying was performed on each end of the resulting main body portion where the first metal film or the second metal film was exposed, i.e. each first side face, to form Metallikon electrodes each serving as an external electrode. The film capacitor was thus obtained.

Each film capacitor thereby produced was evaluated for capacitance, dissipation factor (DF), and dielectric withstanding voltage. Capacitance measurement and DF measurement was carried out with use of an LCR meter under the following conditions: AC 1V; and 1 kHz. Dielectric withstanding voltage measurement was carried out through a test to apply DC voltages ranging from 0 V to 900 V at the maximum to each film capacitor with use of an insulation resistance tester. DC voltages ranging from 0 V to 900 V was applied to each film capacitor at a voltage raising rate of 10 V per second. A voltage at which the value of leakage current reached 0.01 A in each film capacitor was determinative of the dielectric withstanding voltage of the film capacitor.

TABLE 1

| Sample No. | Drawing — | d1 mm | d2 mm | w1 mm | tan(θ1) — | tan(θ2) — | N1-to-M direction — | Crease Presence/Absence | Capacitance μF | Dissipation factor % | Dielectric withstanding voltage V |
|---|---|---|---|---|---|---|---|---|---|---|---|
| 1 | FIG. 15 | 11.2 | 8.0 | — | 0 | 0 | Same | Found | 6.8 | 0.40 | 350 |
| 2 | FIG. 15 | 11.2 | 8.0 | — | 0 | 0 | Reverse | Found | 6.7 | 0.40 | >900 |
| 3 | FIG. 16 | 6.1 | 4.8 | 4.8 | 0.1 | 0.25 | Reverse | Not found | 5.7 | 0.40 | >900 |
| 4 | FIG. 16 | 6.8 | 4.8 | 4.8 | 0.15 | 0.25 | Reverse | Not found | 6.7 | 0.41 | >900 |
| 5 | FIG. 16 | 8.0 | 4.8 | 2.0 | 0.25 | 0.25 | Reverse | Not found | 7.1 | 0.42 | >900 |
| 6 | FIG. 16 | 8.2 | 4.8 | 3.0 | 0.27 | 0.25 | Reverse | Not found | 7.1 | 0.43 | >900 |
| 7 | FIG. 16 | 9.2 | 4.8 | 5.2 | 0.35 | 0.25 | Reverse | Not found | 7.0 | 0.44 | >900 |
| 8 | FIG. 16 | 9.8 | 4.8 | 6.6 | 0.40 | 0.25 | Reverse | Not found | 6.4 | 0.45 | >900 |
| 9 | FIG. 16 | 6.8 | 4.8 | 7.4 | 0.15 | 0.15 | Reverse | Not found | 6.7 | 0.47 | >900 |
| 10 | FIG. 16 | 8.4 | 4.8 | 3.1 | 0.27 | 0.15 | Reverse | Not found | 7.1 | 0.50 | >900 |
| 11 | FIG. 16 | 9.4 | 4.8 | 5.4 | 0.35 | 0.15 | Reverse | Not found | 7.0 | 0.52 | >900 |
| 12 | FIG. 16 | 6.7 | 4.8 | 6.9 | 0.15 | 0.35 | Reverse | Not found | 6.7 | 0.39 | >900 |
| 13 | FIG. 16 | 8.1 | 4.8 | 2.8 | 0.27 | 0.35 | Reverse | Not found | 7.1 | 0.40 | >900 |
| 14 | FIG. 16 | 8.9 | 4.8 | 4.9 | 0.35 | 0.35 | Reverse | Not found | 7.1 | 0.41 | >900 |
| 15 | FIG. 17 | 6.0 | 4.8 | 1.8 | 0.1 | 1.30 | Reverse | Not found | 5.3 | 0.37 | >900 |
| 16 | FIG. 17 | 6.6 | 4.8 | 2.8 | 0.15 | 0.87 | Reverse | Not found | 6.7 | 0.38 | >900 |
| 17 | FIG. 17 | 8.1 | 4.8 | 5.0 | 0.27 | 0.52 | Reverse | Not found | 7.1 | 0.40 | >900 |
| 18 | FIG. 17 | 9.1 | 4.8 | 6.4 | 0.35 | 0.37 | Reverse | Not found | 7.1 | 0.42 | >900 |
| 19 | FIG. 17 | 9.7 | 4.8 | 7.4 | 0.40 | 0.33 | Reverse | Not found | 6.4 | 0.43 | >900 |

TABLE 2

| Sample No. | Drawing — | d1 mm | d2 mm | w1 mm | tan(θ1) — | tan(θ2) — | N1-to-M direction 2a1 and 2a2 | N1-to-M direction 2a and 2b | Crease Presence/Absence | Capacitance μF | Dissipation factor % | Dielectric withstanding voltage V |
|---|---|---|---|---|---|---|---|---|---|---|---|---|
| 20 | FIG. 18 | 4.0 | 2.4 | 2.4 | 0.25 | 0.25 | Same | Reverse | Not found | 7.1 | 0.43 | >900 |
| 21 | FIG. 18 | 3.9 | 2.4 | 2.3 | 0.27 | 0.35 | Same | Reverse | Not found | 7.1 | 0.41 | >900 |
| 22 | FIG. 18 | 4.0 | 2.4 | 2.4 | 0.25 | 0.25 | Reverse | Reverse | Not found | 7.0 | 0.42 | >900 |

Sample Nos. 4 through 7, 9 through 14, 16 through 18, and 20 through 22 were found to range in tan (θ1) from 0.15 or more and 0.35 or less, to include highly insulated cut surfaces, and to include a leakage current value of as low as less than 0.01 A even under application of a DC voltage of 900 V. Moreover, each of these samples exhibited a capacitance of as high as greater than or equal to 6.7 μF, and showed no signs of creases during slitting work and the process of winding the film stack around the drum.

Sample Nos. 1 and 2 showed signs of creases during slitting work and the process of winding the film stack around the drum. In Sample Nos. 3, 8, 15, and 19, although there was no sign of creases, the level of capacitance was low.

REFERENCE SIGNS LIST

A, C: Film capacitor
B: Combination type capacitor
E: Inverter
F: Electric vehicle
1, 1a, 1b: Dielectric film
2, 2a, 2b: Metal film
2d: First portion
2di: First film segment
2e: Second portion
2ei: Second film segment
3: Main body portion
4, 4a, 4b: External electrode
5, 5a, 5b: Metallized film
6, 6a, 6b: Insulation margin
7: Effective region
8: First slit
9, 9a, 9b: Second slit
11: Junction
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a main body portion shaped in a rectangular prism, comprising a laminate including at least one set of a dielectric film, a first metal film and a second metal film, the first metal film and the second metal film being disposed to face each other with the dielectric film lying in between; and
external electrodes located on surfaces of the main body portion,
the main body portion comprising a pair of opposed faces in a thickness direction of the dielectric film, and a pair of first side faces opposed to each other and a pair of second side faces opposed to each other, each providing a connection between the pair of opposed faces,
the external electrodes being disposed on the first side faces,
in the case where a direction of arrangement of the second side faces is defined as a first direction, the dielectric film comprising an insulation margin that is located on a part of the dielectric film which part is not covered with the first metal film or the second metal film, and extends continuously in the first direction,
the first metal film and the second metal film each comprising a plurality of film segments separated by a plurality of first slits and a plurality of second slits, the plurality of first slits each comprising a first end which is contiguous to the insulation margin and at an angle of θ1 to the second side face, the plurality of second slits each comprising an oblique slit at an angle of θ2 to the first side face,
each one of the second slits being connected at a contact point to corresponding one of the first slits,
in the case where it is defined that the contact point in a first end-to-contact point direction in each one of the first slits is located on a positive side in the first direction, the second slit comprising a second end which is located away from the insulation margin relative to the contact point, and also located on a negative side in the first direction relative to the contact point,
a second end of one of two second slits disposed adjacent to each other which is located on the positive side in the first direction being positioned in alignment with a first end of a first slit which is continuous with the other second slit located on the negative side in the first direction, or positioned on the negative side in the first direction beyond the first end in the first direction,
with respect to the angle of θ1, a value of tan (θ1) being in a range of 0.15 or more and 0.35 or less.

2. The film capacitor according to claim 1,
wherein, when two adjacent second slits of the second slits are projected on the first side face, a length of an overlap of the two second slits is greater than a spacing between the first slits in the first direction.

3. The film capacitor according to claim 1,
wherein, when two adjacent second slits of the second slits are projected on the first side face, a length of an overlap of the two second slits is greater than a length of each of the first slits in the first direction.

4. The film capacitor according to claim 1,
wherein with respect to the angle of θ1, the value of tan (θ1) is greater than or equal to 0.27.

5. The film capacitor according to claim 1,
wherein the oblique slit is connected at the contact point to corresponding one of the first slits.

6. The film capacitor according to claim 1,
wherein the second slits each comprise a third end located on the positive side in the first direction relative to the contact point.

7. The film capacitor according to claim 1,
wherein the second slits are comprised of three or less rectilinear slits.

8. The film capacitor according to claim 1,
wherein the second slits are comprised of a single rectilinear slit.

9. The film capacitor according to claim 1,
wherein, in a plan view of the film capacitor as viewed in the thickness direction, a first end-to-contact point direction in the first metal film and a first end-to-contact point direction in the second metal film are oppositely oriented in the first direction.

10. A combination type capacitor, comprising:
a plurality of film capacitors; and
at least one bus bar electrically connecting all of the plurality of film capacitors,
the plurality of film capacitors comprising the film capacitor according to claim 1.

11. An inverter, comprising:
a bridge circuit comprising switching elements; and
a capacitance member connected to the bridge circuit,
the capacitance member comprising the film capacitor according to claim 1.

12. An electric vehicle, comprising:
a power supply;
the inverter according to claim 11, connected to the power supply;
a motor connected to the inverter; and
wheels driven by the motor.

* * * * *